US007971185B2

(12) United States Patent     (10) Patent No.: US 7,971,185 B2
Toomey et al.     (45) Date of Patent: *Jun. 28, 2011

(54) SYSTEM AND METHOD FOR SUPPORTING DATA DRIVING A SOFTWARE PROCESS USING OBJECTS OF ARBITRARY DATA TYPES

(75) Inventors: Joseph Patrick Toomey, Lowell, MA (US); Sung-Jun Pak, Westford, MA (US); William Arthur Goddin, Jr., Stow, MA (US)

(73) Assignee: International Business Machines Corporation, Armonk, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/343,823

(22) Filed: Dec. 24, 2008

(65) Prior Publication Data
US 2009/0100408 A1    Apr. 16, 2009

Related U.S. Application Data

(63) Continuation of application No. 11/026,538, filed on Dec. 30, 2004, now Pat. No. 7,519,945.

(60) Provisional application No. 60/580,578, filed on Jun. 17, 2004.

(51) Int. Cl.
    *G06F 9/44* (2006.01)
    *G06F 7/00* (2006.01)

(52) U.S. Cl. ........ 717/108; 717/111; 717/114; 717/118; 717/139; 707/640; 707/793; 707/803; 715/212; 715/234; 715/237

(58) Field of Classification Search .................. 717/139, 717/165, 106–119; 707/640, 781, 793, 803; 715/212, 227, 234, 237
See application file for complete search history.

(56) References Cited

U.S. PATENT DOCUMENTS

| | | | |
|---|---|---|---|
| 5,551,029 A | 8/1996 | Jagadish et al. | |
| 5,566,295 A | 10/1996 | Cypher et al. | |
| 5,675,801 A | 10/1997 | Lindsey | |
| 6,523,169 B1 | 2/2003 | Glunz | |
| 7,047,525 B2 | 5/2006 | Prunty et al. | |
| 7,143,416 B1* | 11/2006 | Nachef et al. | 719/315 |
| 2002/0016814 A1* | 2/2002 | Convent et al. | 709/203 |
| 2003/0208743 A1 | 11/2003 | Chong et al. | |

(Continued)

OTHER PUBLICATIONS

Bandinelli, S.; Fuggetta, A.; Lavazza, L.; Loi, M.; Picco, G.P.; Modeling and improving an industrial software process; IEEE; Issue Date: May 1995; vol. 21 Issue:5; pp. 440-454.*

(Continued)

*Primary Examiner* — Anna Deng
*Assistant Examiner* — Satish Rampuria
(74) *Attorney, Agent, or Firm* — Hamilton, Brook, Smith & Reynolds, P.C.

(57) ABSTRACT

The present invention provides a method for supporting data driving a software process. The method comprises receiving, from a user, input of a class of an object of a non-primitive data type; and providing to the user a description of the collection of attributes necessary to construct an instance of the object, based only on the class of the object. The step of receiving the class of the object is free of receiving a pre-existing instance of the data type. In further related embodiments, the method further comprises receiving, in a single user step, user input of defining attribute data necessary to create the instance of the object and set it into a desired state; and creating and initializing the instance of the object using the defining attribute data; wherein the defining attribute data does not include a pre-existing instance of the data type.

13 Claims, 5 Drawing Sheets

U.S. PATENT DOCUMENTS

| | | | |
|---|---|---|---|
| 2005/0235258 A1* | 10/2005 | Wason | 717/110 |
| 2005/0262493 A1 | 11/2005 | Schmidt et al. | |
| 2006/0259499 A1* | 11/2006 | Moulckers et al. | 707/100 |
| 2007/0033573 A1 | 2/2007 | Nachef et al. | |

OTHER PUBLICATIONS

Marshaling/demarshaling as a compilation/interpretation process, Queinnec, C.; IEEE, Apr. 1999, pp. 1-6.

Compiler optimized remote method invocation, Veldema, R.; Philippsen, M.; IEEE, 2003, pp. 1-10. (Month of Publication Not Available.).

Efficient object serialization in Java, Opyrchal, L.; Prakash, A., Electronic Commerce and Web-based Applications/Middleware, 1999. Proceedings. 19$^{th}$ IEEE International, Conference on Distributed Computing Systems Workshops on, 1999, IEEE, pp. 96-101. (Month of Publication Not Available.).

Design-time assembly of runtime containment components, Lorenz, D.H.; Petkovic, P., Technology of Object-Oriented Languages and Systems, 2000. TOOLS 34. Proceedings. 34$^{th}$ International, Conference on, 2000, IEEE, pp. 195-204. (Month of Publication Not Available.).

* cited by examiner

SYSTEM AND METHOD FOR SUPPORTING DATA DRIVING A SOFTWARE PROCESS USING OBJECTS OF ARBITRARY DATA TYPES

RELATED APPLICATION

This applications is a continuation of U.S. application Ser. No. 11/026,538, filed on Dec. 30, 2004, which claims the benefit of U.S. Provisional Application No. 60/580,578, filed on Jun. 17, 2004. The entire teachings of the above applications are incorporated herein by reference.

BACKGROUND OF THE INVENTION

There are many marshalling/serializing frameworks that purport to know what data needs to be serialized in order to save the state of a given, pre-existing object; and how to reconstruct the same object given the serialized representation. Java™ Serialization, XMI™, SOAP, ValueClasses, and JVT's provide some examples of such marshalling/serializing frameworks.

In addition, there is the Universal Test Client in WSAD™, which addresses marshalling/serializing issues in a data and behavioral manner. It allows the user to construct objects of arbitrary data types by first allowing the user to choose one of the available constructors for the object, and to specify the data for that constructor; and then subsequently allowing the user to execute methods of that object, and again pass data into those methods, in order to complete the process of driving it into the desired state.

SUMMARY OF THE INVENTION

In accordance with an embodiment of the invention, there is provided a method for supporting data driving a software process. The method comprises receiving, from a user, input of a class of an object of a non-primitive data type; and providing to the user a description of the collection of attributes necessary to construct an instance of the object, based only on the class of the object; wherein receiving the class of the object is free of receiving a pre-existing instance of the data type.

In further related embodiments, the method further comprises receiving, in a single user step, user input of defining attribute data necessary to create the instance of the object and set it into a desired state; and creating and initializing the instance of the object using the defining attribute data; wherein the defining attribute data does not include a pre-existing instance of the data type. A user selection may be received, to select a defining attributes manager to use to specify the defining attribute data required for the data type; or a map means may be used to infer a desirable selection of the defining attributes manager. The defining attributes manager may be used to specify the defining attribute data required for the data type; and may use a pattern to support a category of classes of data types, or may support a single data class.

In other related embodiments, the method may further comprise receiving, in a single user step, user input of defining attribute data necessary to create the instance of the object and set it into a desired state; and outputting source code that, when executed, will construct and initialize the instance of the object using the defining attribute data; wherein the defining attribute data does not include a pre-existing instance of the data type. Also, the method may comprise comparing more than one potentially different instance of the data type based on the defining attribute data. The method may also comprise receiving a user-defined defining attributes manager that may be used to specify the defining attribute data required for the data type; and allowing the user to select and use the user-defined defining attributes manager to specify the defining attribute data. The defining attribute data may be received via user interaction with a user interface; and may be used during test execution, including by comparing instantiated objects to provide verification point results.

In another embodiment according to the invention, there is provided a system for supporting data driving a software process. The system comprises a defining attributes framework for receiving, from a user, input of a class of an object of a non-primitive data type, without receiving a pre-existing instance of the data type; and a user interface for providing to the user a description of the collection of attributes necessary to construct an instance of the object, based only on the class of the object.

In further, related embodiments, the user interface may comprise means for receiving, in a single user step, user input of defining attribute data necessary to create the instance of the object and set it into a desired state, wherein the defining attribute data does not include a pre-existing instance of the data type; and wherein the system further comprises an object module for creating and initializing the instance of the object using the defining attribute data. The system may also comprise a defining attributes manager selection means for receiving a user selection of a defining attributes manager to use to specify the defining attribute data required for the data type; or a map means for inferring a desirable selection of a defining attributes manager. The system may also comprise a defining attributes manager for specifying the defining attribute data required for the data type. The defining attributes manager may be capable of using a pattern to support a category of classes of data types, or may be capable of supporting a single data class.

In other related embodiments, the user interface of the system may comprise means for receiving, in a single user step, user input of defining attribute data necessary to create the instance of the object and set it into a desired state, wherein the defining attribute data does not include a pre-existing instance of the data type; and wherein the system further comprises a source code module for outputting source code that, when executed, will construct and initialize the instance of the object using the defining attribute data. The system may also comprise a comparator for comparing more than one potentially different instance of the data type based on the defining attribute data; and an extensible defining attributes manager module, capable of receiving a user-defined defining attributes manager that may be used to specify the defining attribute data required for the data type, and capable of allowing the user to select and use the user-defined defining attributes manager to specify the defining attribute data. The system may also comprise a verification points component for comparing instantiated objects to provide verification point results during test execution.

In another embodiment according to the invention, there is provided a computer-readable medium carrying one or more sequences of instructions for supporting data driving a software process, wherein execution of the one or more sequences of instructions by one or more processors causes the one or more processors to perform the steps of: receiving, from a user, input of a class of an object of a non-primitive data type; and providing to the user a description of the collection of attributes necessary to construct an instance of the object, based only on the class of the object; wherein receiving the class of the object is free of receiving a pre-existing instance of the data type. Execution of the one or more sequences of instructions by one or more processors further causes the one or more processors to perform the steps of: receiving, in a single user step, user input of defining attribute data necessary to create the instance of the object and set it into a desired state; and creating and initializing the instance of the object using the defining attribute data; wherein the defining attribute data does not include a pre-existing instance of the data type.

In another embodiment according to the invention, there is provided a system for supporting data driving a software process, the system comprising a defining attributes means for receiving, from a user, input of a class of an object of a non-primitive data type, without receiving a pre-existing instance of the data type; and a user interface means for providing to the user a description of the collection of attributes necessary to construct an instance of the object, based only on the class of the object.

In a further embodiment according to the invention, there is provided a computer program propagated signal product embodied on a propagated signal on a propagation medium, such propagated signal carrying one or more sequences of instructions for supporting data driving a software process, wherein execution of the one or more sequences of instructions by one or more processors causes the one or more processors to perform the steps of: receiving, from a user, input of a class of an object of a non-primitive data type; and providing to the user a description of the collection of attributes necessary to construct an instance of the object, based only on the class of the object; wherein receiving the class of the object does not include receiving a pre-existing instance of the data type.

BRIEF DESCRIPTION OF THE DRAWINGS

The foregoing and other objects, features and advantages of the invention will be apparent from the following more particular description of preferred embodiments of the invention, as illustrated in the accompanying drawings.

DETAILED DESCRIPTION OF THE INVENTION

Figure 1:
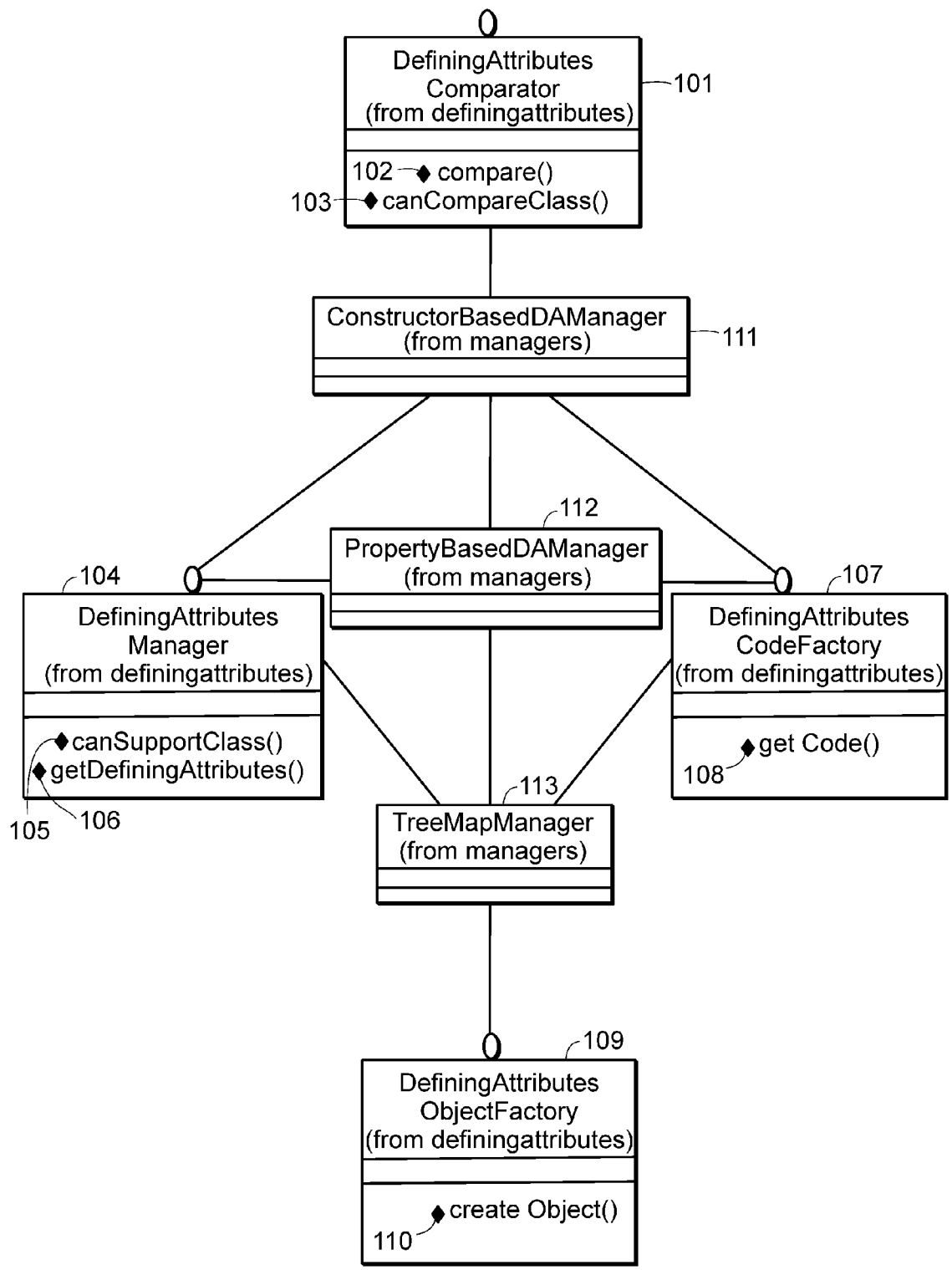
FIG. 1 is a class diagram of the interfaces implemented by some sample Defining Attributes Managers, in accordance with an embodiment of the invention.

In contrast with an embodiment according to the invention, many present marshalling/serializing frameworks, such as Java™ Serialization, XMI™, SOAP, ValueClasses, and JVT's, do not solve the problem of creating an object of an arbitrary data type from user input in the absence of a pre-existing instance of that type. In other words, if a tool would like to allow the user to specify the data necessary to create an instance of an object of a non-primitive data type and drive it into a particular state, none of these technologies can indicate the correct collection of data that the user needs to specify; nor do any of them provide the capability to construct the actual object instance given that collection of data.

While the Universal Test Client in WSAD™ does allow the user to construct objects of arbitrary data types using certain procedures, its solution is overly complex for several reasons. First, the user must go through a series of different actions in order to create a single object. For example, to construct an instance of a class that is compliant with the JavaBean™ specification, the user may need to call the no-arg constructor (the only constructor required by the JavaBean™ spec), and then manually call a set method for every attribute of the class that needs to be assigned. In a simple Bean with only three attributes that need to be assigned, this method requires the user to call the constructor and then call three separate methods, simply to initialize a single object—even assuming that none of the attributes themselves are non-primitives. Second, this solution requires the tool user to understand the inner workings of the data types of objects being created. The Universal Test Client does have specific support for creating J2EE™ components such as EJB's™. However, if the user is creating an instance of some other data type that requires that certain attributes must be set before an initialization routine is invoked, then the user must be aware of, and follow that requirement every time he or she creates an instance of that data type. Such a procedure is somewhat onerous if the user is not the author of that data type. Any failure of the user to properly orchestrate the behavioral portion of the object's initialization sequence results in failure of the object creation.

By contrast, in accordance with an embodiment of the invention, a Defining Attributes Framework provides a framework to support data driving a software process using objects of arbitrary data types. The Defining Attributes Framework allows the user to specify, in one step, the entire collection of data needed to construct an object of an arbitrary data type and drive it into the desired state. The Defining Attributes Framework also provides the capability to take that collection of data and use it to construct the object and drive it into the desired state.

In contrast to prior techniques, in order to use the Defining Attributes Framework according to an embodiment of the invention to construct an instance of a class that is compliant with the JavaBean™ spec, for example, the user can simply specify the values of the attributes of the class. The collection of attributes that need to be specified is provided by the JavaBean™ Defining Attributes Manager, which may be chosen by the user as the Defining Attributes Manager to use, or may be inferred by the tool via a map or similar construct. The user need not understand any of the inner-workings of the data type in order to create an instance of it.

Similarly, by contrast with the technique of the Universal Test Client, an embodiment according to the invention requires the user simply to provide the collection of necessary data (or set of defining attributes) as specified by the Defining Attributes Manager. There is neither a requirement that the user understand the mechanism by which the object is constructed and initialized, nor the possibility that the user will make an error in the order in which attributes are set and methods are invoked; because the Defining Attributes Framework abstracts away the mechanism that constructs and initializes the object, exposing only the data necessary to facilitate it.

Absent the Defining Attribute Framework of an embodiment according to the invention, given no pre-existing instances of a given, arbitrary class, one can not programmatically determine the collection of attributes which are necessary to construct an instance of that class and set it into a particular state. We call these collections of attributes the "defining attributes" of the class, while noting that any given class may be supportable by more than one set of defining attributes. In accordance with an embodiment of the invention, there is provided a framework in which the user can specify, either manually or through a pre-populated map, a Defining Attributes Manager that specifies the collection of defining attributes to use for a given class. These Defining Attributes Managers may use a pattern to support a category of classes, such as: "all classes adhering to the Java Bean™ specification"; "all classes that can be fully specified by passing in all parameters to a given constructor"; "all Enterprise Java Beans™"; or "all classes implementing the List interface." Alternatively, Defining Attribute Manager may support only a single class, perhaps calling some initialization routines in a necessary order known to the developer of the class.

In accordance with an embodiment of the invention, each Defining Attributes Manager provides two core services. First, given a type that it supports, it can specify the collection of attributes (name and type) necessary to construct and initialize an instance of that type. Second, given that same data type and a populated collection of that data (name, type, and value), it provides an object module service that can construct and initialize the instance described by that collection.

Defining Attributes Managers (DAM's) in accordance with an embodiment of the invention can also provide other services that are useful for tools that automate software processes. A Defining Attributes Manager may expose a source code module service for types that it supports. A source code module service emits source code that, when executed, will construct the object described by a set of defining attributes and drive it into the specified state. This differs from the DAM's object module service in that, with a source code module, the object creation and initialization is not performed by the DAM itself, but rather by the execution of the code that it emitted. This allows object creation to be performed without the assistance or availability of the Defining Attributes Manager. Another optional service that a Defining Attributes Manager may expose, in accordance with an embodiment of the invention, is a comparator. If a DAM exposes a comparator service, then the DAM is capable of comparing instances of the data types that it supports. Thus, using a comparator, the DAM may leverage its knowledge of the collection of attributes that define instances of those data types.

In addition, in accordance with an embodiment of the invention, the Defining Attributes Framework is extensible. Just as a tool vendor can implement DAM's to support the set of types that they deem important, so can the end user write DAM's to support types that they find necessary. They can then register their DAM's with the framework, and thereby get first class support for any data types that they need to support beyond what is provided by the tool vendor.

Thus, an embodiment according to the invention provides a set of interfaces and classes that can be used to provide persistence, code generation, object creation and comparison for data including native types such as 'int' or object types such as 'java.lang.BigDecimal,' as well as arrays of these types. An embodiment may be used by a code generation component to provide code used in an equivalence class to instantiate the data user has entered through a user interface; and may also provide the capability to directly instantiate the object the user has described. It may be used to compare two pieces of data (native, complex or array); and is fully extensible, allowing users to register custom Defining Attribute Managers to customize support for specific object types.

To use an embodiment according to the invention during data definition, a user interacts with a user interface to specify the data to be used during test execution. The specified data includes inputs to methods, as well as expected output values to be used for comparison. The user interface interacts with a Defining Attributes component to populate the data structure sub-component. When the user interface is saved, the user interface invokes the persistence framework of a Defining Attributes support class sub-component. The data structure is then serialized in XML and stored. When the user interface is reopened, the Defining Attributes support class sub-component converts the retrieved XML string back to instances of the data structure classes.

When an embodiment according to the invention is used during code generation, a code generation component interacts with the Defining Attributes component to get the code that will instantiate the data that the user specified during the data definition phase. The code generation component retrieves the data as XML, and calls the persistence framework of the Defining Attributes component to call up one of the data structure classes. The data structure class implements a code generation interface, which is called and serves up the code fragment.

When an embodiment according to the invention is used during test execution, there may be several verification points. A verification points component interacts with a Defining Attributes component, which converts each of the instantiated objects to one of the data structure classes via a Defining Attributes Converter interface. The data structure classes are then compared to provide verification point results.

In accordance with an embodiment of the invention, several different data structure classes may be used to represent an object or native data, including an array.

As a first example of a data structure class in accordance with an embodiment of the invention, the Attribute class may be used by the Defining Attributes framework to store and access information about an object. An object in this context is a "name-value-datatype" triple that can represent either a native type such as 'int' or complex types such as 'java.math.BigDecimal'. The Attribute class may represent an object at the outermost level, or it may be used to describe an element of a more complex object or an array. For example, the Attribute class can be used to describe an 'int' with value "1":

Attribute of type: int, dimension: 0, value: "1"

As another example, the Attribute class may also represent an integer array, by nesting in conjunction with ArrayInfo. In this case, the outer Attribute class represents the array, and inner Attribute classes will represent each of the elements:

Attribute type: int, dimension: 1, value: an instance of ArrayInfo (a Vector of Attributes)

As another example, the Attribute class may also represent the 'year' portion of an instance of a GregorianCalendar object, by nesting in conjunction with IDefiningAttributes:

Attribute type: int, dimension: 0, value: an instance of IDefiningAttributes—contains an ArrayList of Attributes.

In accordance with an embodiment of the invention, apart from storing information about an object including its value, type, name and array dimension, the Attribute class may also generate java code fragments to instantiate the data it represents, by implementing an attribute code module.

As a second example of a data structure class in accordance with an embodiment of the invention, an ArrayInfo class may be used in conjunction with the Attribute class to represent arrays. The ArrayInfo class is a vector of Attributes, with the additional capability of serving up code fragments that instantiate the array. This class is used to store a vector of Attributes to represent an array. It can also generate a code fragment to instantiate the array by implementing an array code module. An array of one dimensional int would be represented as an ArrayInfo containing a vector of Attributes that represents individual elements. A two dimensional array would be represented as an ArrayInfo containing a vector of Attributes that each represent a one dimensional array.

As a third example of a data structure class in accordance with an embodiment of the invention, a DefiningAttributes class may be used in conjunction with the Attribute class to represent an object (non native data). It holds an ArrayList of the Attribute. An instance of DefiningAttributes is produced by implementations of a Defining Attributes Manager.

In accordance with an embodiment of the invention, several different Defining Attributes Interfaces may be used to allow for extensible complex object (non-native) support. A Defining Attributes Manager is created by implementing some or all of these interfaces.

As a first example of a Defining Attribute Interface, in accordance with an embodiment of the invention, there is an IDefiningAttributesManager interface. Implementation of this interface allows a Defining Attributes Manager to answer whether it supports a particular class. It also decides what set or sets of Attributes are used to represent a particular class. For example, a Defining Attributes Manager for java.math.Integer defines that this class can be defined by a single Attribute of type 'int'. A Defining Attributes Manager for a Gregorian calendar may specify multiple ways to represent java.util.GregorianCalendar. One of the ways is with three Attributes of type 'int' each representing 'year', 'month', and 'day'. Alternatively, the manager may provide a second way of representing a GregorianCalendar object with six integers, 'year', 'month', 'day', 'hour', 'minute', and 'second'. An implementation of the Defining Attribute Interface may support more than one class, as with CollectionManager, PropertyBasedDAManager and ConstructorBasedDAManager (discussed below).

As other examples of a Defining Attribute Interface, in accordance with an embodiment of the invention, implementation of an IDefiningAttributesCodeFactory interface allows a Defining Attributes Manager to return code that can instantiate the object. Implementation of an IDefiningAttributesObjectFactory interface allows a Defining Attributes Manager to return an instance of the object. Implementation of an IDefiningAttributesComparator interface allows a Defining Attributes Manager to provide comparison.

As another example of a Defining Attribute Interface, in accordance with an embodiment of the invention, implementation of an IDefiningAttributesConverter interface allows conversion from object instances back to DefiningAttributes. A verification point component may call the IDefiningAttributesConverter interface to convert objects to DefiningAttributes. The verification point component may then compare the two DefiningAttributes using value classes. The verification point component may call the IDefiningAttributesComparator interface in the absence of an IDefiningAttributesConverter interface.

An embodiment according to the invention may also include several Defining Attributes Support classes, such as helper classes, a registration mechanism, and a persistence framework.

Some examples of Defining Attribute Managers, which are implementations of Defining Attribute Interfaces in accordance with an embodiment of the invention, include class-specific managers for JDK™ classes, as well as generic managers for JavaBeans™ and EJB's™; and more general constructor-based managers. Some examples of such Defining Attribute Managers are: a BigDecimalManager, which provides specific support for java.lang.BigDecimal and classes that extend it; a CollectionManager, which provides support for all classes implementing the java.util.Collection interface; a PropertyBasedDAManager, which provides support for classes that meet the JavaBean™ criteria; and a ConstructorBasedDAManager, which provides fallback support using constructors.

An embodiment according to the invention may be implemented in the Java language, or the .Net™ (C#) language, or in any other suitable programming language known to those of skill in the art.

FIG. 1 is a class diagram of the interfaces implemented by some sample Defining Attributes Managers, in accordance with an embodiment of the invention. An IDefiningAttributes Manager interface 104 may be implemented to allow a Defining Attributes Manager (such as DAM's 111-113) to answer whether it supports a particular class. This may be done using a function canSupportClass( ) 105. Also, the interface 104 can decide what set or sets of Attributes are used to represent a particular class, using a function getDefiningAttributes( ) 106. Next, an IDefiningAttributesCodeFactory interface 107 may be implemented to allow a Defining Attributes Manager 111-113 to act as a source code module and return code that can instantiate the object, using a function getCode( ) 108. Similarly, an IDefiningAttributesObjectFactory interface 109 may be implemented to allow a Defining Attributes Manager 111-113 to act as an object module and return an instance of the object, using function createObject( ) 110. An IDefining AttributesComparator interface 101 may be implemented to allow a Defining Attributes Manager 111-113 to provide comparison, using functions compare( ) 102 and canCompareClass( ) 103. Three examples of Defining Attributes Managers are shown in FIG. 1, although others may be used: a ConstructorBasedDAManager 111, a PropertyBasedDAManager 112, and a TreeMapManager 113. Other examples of Defining Attributes Managers that may be used are: BigDecimalManager, BigIntegerManager; BooleanManager; ByteManager; FloatManager; HashMapManager; HashSetManager; HashTableManager; IntegerManager; CharacterManager; DateManager; ExceptionManager; DoubleManager; KeyValuePairManager; LinkedListManager; LongManager; PropertiesManager; ShortManager; StackManager; StringBufferManager; ThrowableManager; TreeSetManager; and WeakHashMapManager.

Figure 2:
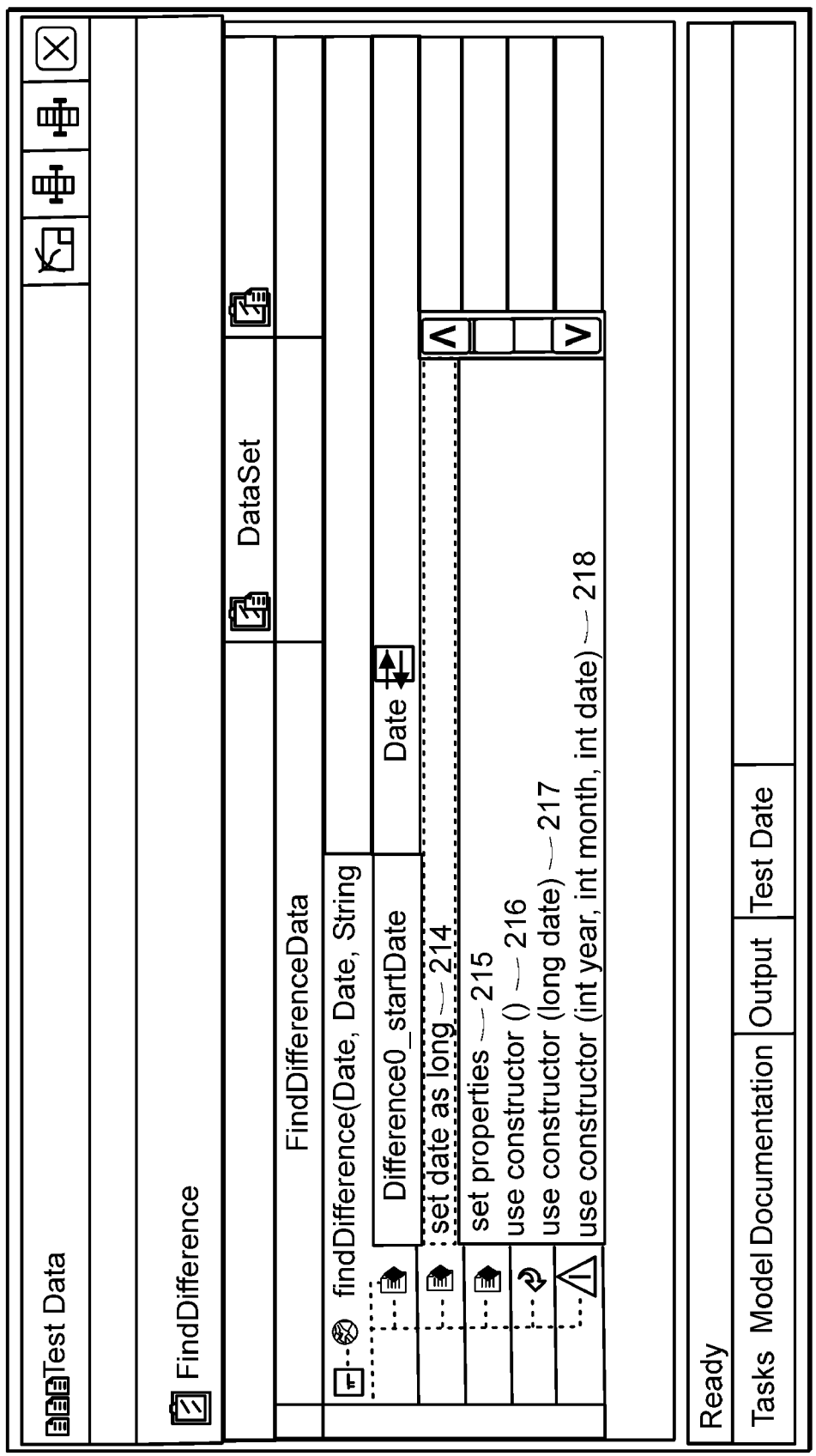
FIGS. 2 and 3 show examples of screen shots that may be used by a user interface of a Defining Attributes Framework, in accordance with an embodiment of the invention.
Figure 3:
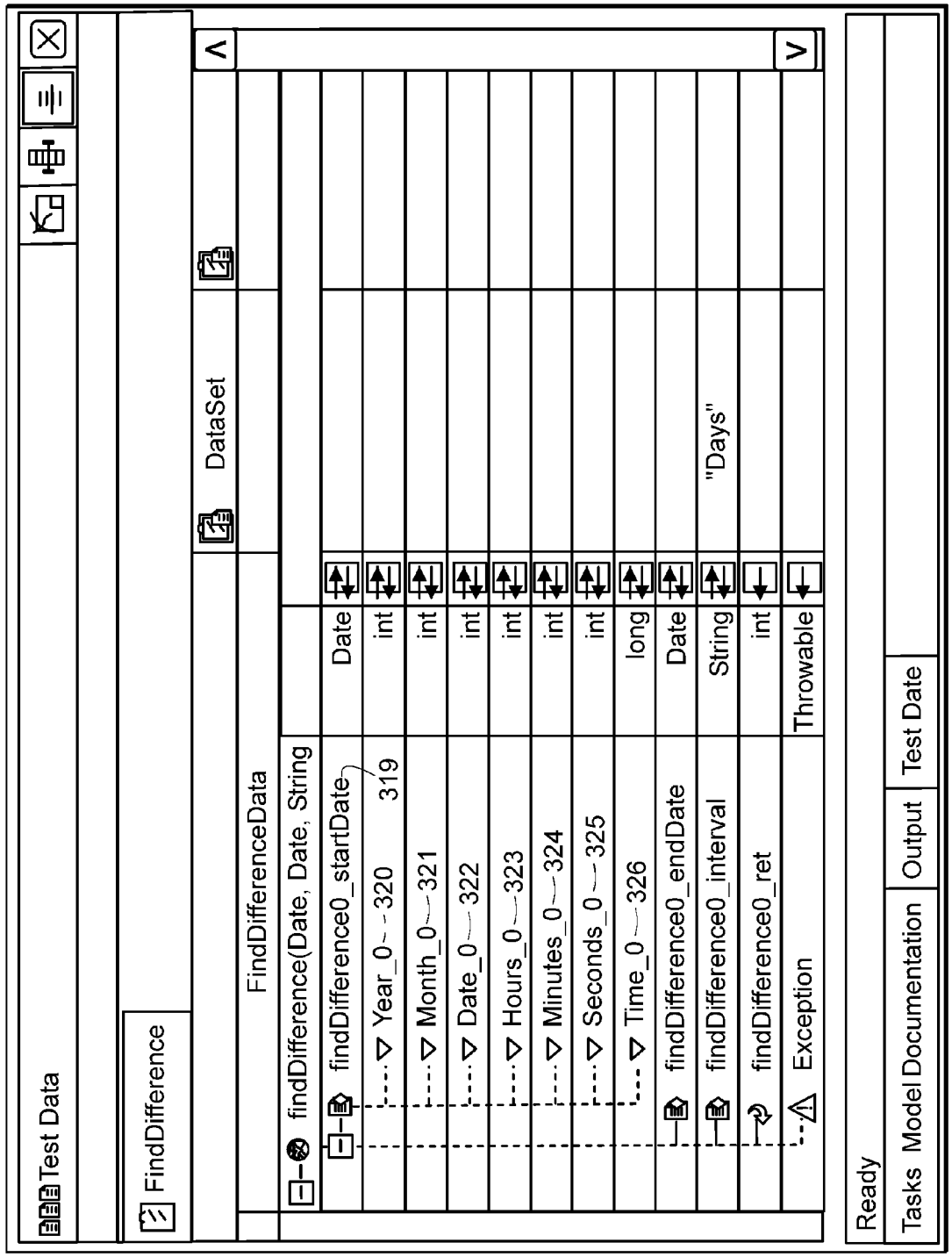

FIGS. 2 and 3 show examples of screen shots that may be used by a user interface of a Defining Attributes Framework, in accordance with an embodiment of the invention. It will be appreciated that other user interfaces may be used, in accordance with an embodiment of the invention. For example, user interfaces may operate on any kind of operating system, and need not even use a windows-style interface.

In the example of FIG. 2, three defining attributes managers are registered to support the object, which is of type Date. The first, set date as long 214, is a custom DAM for the Date class. The second, set properties 215, uses the PropertyBasedDAManager 112 (of FIG. 1), which provides support for all classes that comply with the JavaBean™ spec. The third, fourth and fifth, use constructor ( ) 216, use constructor (long date) 217, and use constructor (int year, int month, int date) 218 are all provided by the ConstructorBasedDAManager 111 (of FIG. 1), exposing each of the public constructors of the Date class.

In the example of FIG. 3, one of the DAM's has been selected via the user interface of FIG. 2, and the DAM has been asked to provide the correct set of defining attributes for the specified type. In the data table of the user interface of FIG. 3, the row 319 representing the object expands to display the defining attributes 320-326 that were provided by the DAM for the object (in this case, the PropertyBasedDAManager).

Figure 4:
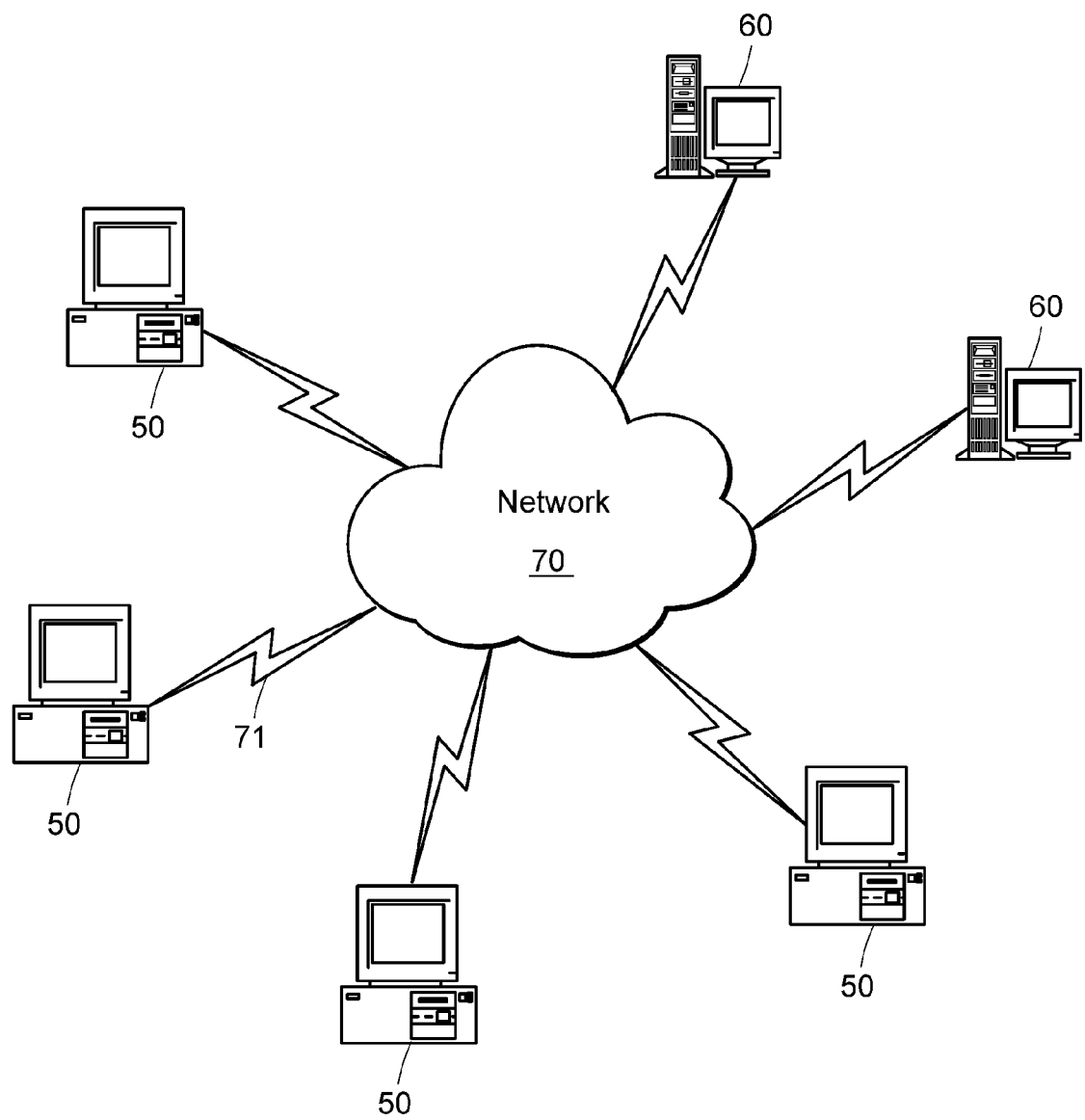
FIG. 4 illustrates a computer network or similar digital processing environment in which an embodiment according to the invention may be implemented.

FIG. 4 illustrates a computer network or similar digital processing environment in which an embodiment according to the invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
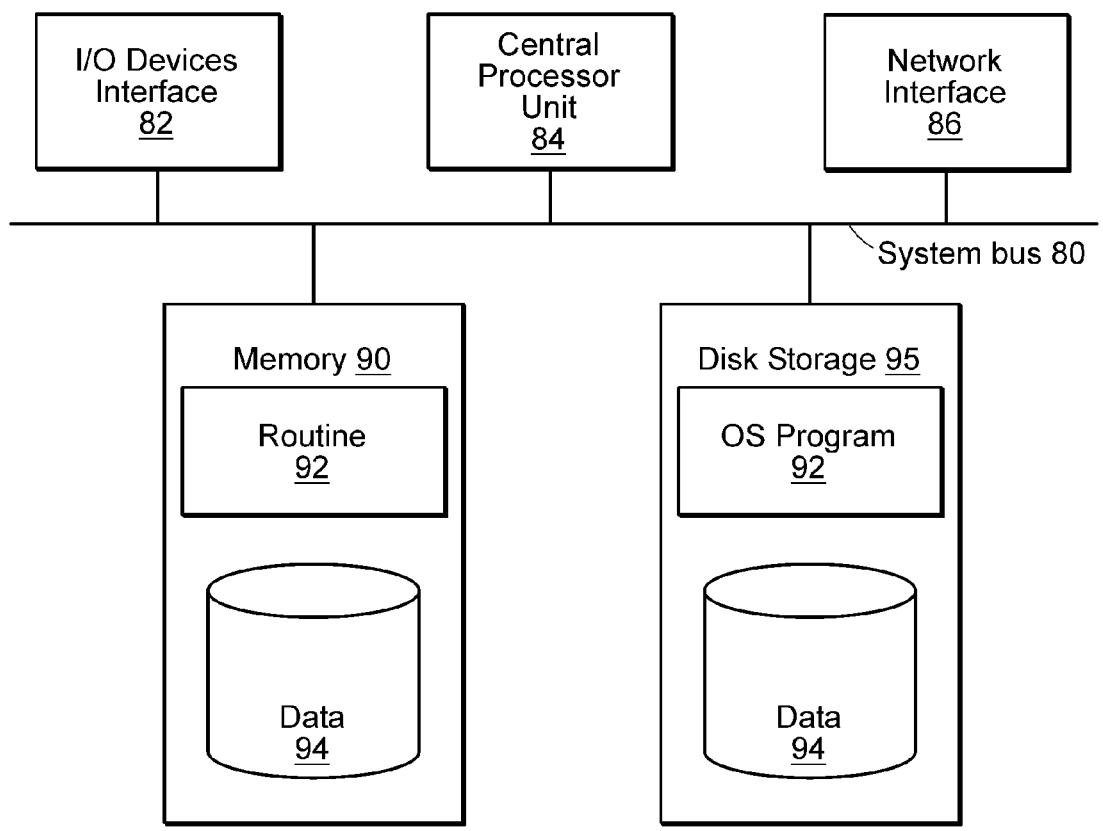
FIG. 5 is a diagram of the internal structure of a computer in the computer system of FIG. 4, upon which an embodiment according to the invention may be implemented.

FIG. 5 is a diagram of the internal structure of a computer (e.g., client processor/device 50 or server computers 60) in the computer system of FIG. 4, upon which an embodiment according to the invention may be implemented. Each computer 50, 60 contains system bus 80, where a bus is a set of hardware lines used for data transfer among the components of a computer or processing system. Bus 80 is essentially a shared conduit that connects different elements of a computer system (e.g., processor, disk storage, memory, input/output ports, network ports, etc.) that enables the transfer of information between the elements. Attached to system bus 80 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions used to implement an embodiment of the present invention (e.g., Program Routines 92 and Data 94, detailed later). Disk storage 95 provides non-volatile storage for computer software instructions 92 and data 94 used to implement an embodiment of the present invention. Central processor unit 84 is also attached to system bus 80 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 71 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals/medium, storage medium and the like.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer-based system for supporting data driving a software process, the system comprising:
   a choice of a plurality of defining attributes managers to allow selection, from the plurality of a defining attributes manager that provides;
      a defining attributes framework executing on a processor and receiving, from a user, input of a class of an object of a non-primitive data type, in absence of a pre-existing instance of the data type; and
      a user interface executing on the processor and providing to the user a description of the collection of attributes necessary to construct an instance of the object, based only on the class of the object, such that the system supports data driving the software process using objects of arbitrary data types and free of the user understanding any inner workings of the non-primitive data type in order to create and initialize the instance of the object using defining attribute data received from the user;
   using a map means to infer a desirable selection of the defining attributes manager;
   using the selected defining attributes manager to provide to the user the description of the collection of attributes necessary to construct the instance of the object, based only on the class of the object;
   receiving, in a single user step, user input of defining attribute data necessary to create the instance of the object and set it into a desired state, the received defining attribute data not including a pre-existing instance of the data type;
   using the selected defining attributes manager to create and initialize the instance of the object using the received defining attribute data;
   the receiving of the user input of the defining attribute data, and the creating and initializing of the instance of the object using the received defining attribute data, not requiring knowledge by the user of the constructors, methods, data structure and initialization sequence necessary to construct the instance of the object; and
   comparing more than one potentially different instance of the data type based on the defining attribute data.

2. A computer-based system according to claim 1, wherein the user interface comprises means for receiving, in a single user step, user input of defining attribute data necessary to create the instance of the object and set it into a desired state, wherein the defining attribute data does not include a pre-existing instance of the data type; and wherein the system further comprises:

an object module executing on a computer and creating and initializing the instance of the object using the defining attribute data.

3. A computer-based system according to claim 2, further comprising:
a defining attributes manager selection means executing on the computer for receiving a user selection of a defining attributes manager to use to specify the defining attribute data required for the data type.

4. A computer-based system according to claim 2, further comprising:
a map means executing on the computer for inferring a desirable selection of a defining attributes manager to use to specify the defining attribute data required for the data type.

5. A computer-based system according to claim 2, further comprising:
a defining attributes manager executing on the computer for specifying the defining attribute data required for the data type, wherein the defining attributes manager is capable of using a pattern to support a category of classes of data types.

6. A computer-based system according to claim 2, further comprising:
a defining attributes manager executing on the computer for specifying the defining attribute data required for the data type, wherein the defining attributes manager is capable of supporting a single data class.

7. A computer-based system according to claim 1, wherein the user interface comprises means for receiving, in a single user step, user input of defining attribute data necessary to create the instance of the object and set it into a desired state, wherein the defining attribute data does not include a pre-existing instance of the data type; and wherein the system further comprises:
a source code module for outputting source code that, when executed, constructs and initializes the instance of the object using the defining attribute data.

8. A computer-based system according to claim 2, further comprising:
a comparator comparing more than one potentially different instance of the data type based on the defining attribute data.

9. A computer-based system according to claim 2, further comprising:
an extensible defining attributes manager module, capable of receiving a user-defined defining attributes manager that may be used to specify the defining attribute data required for the data type, and capable of allowing the user to select and use the user-defined defining attributes manager to specify the defining attribute data.

10. A computer-based system according to claim 2, further comprising:
a verification points component for comparing instantiated objects to provide verification point results during test execution.

11. A computer program product comprising:
a non-transitory computer-readable storage medium carrying one or more sequences of instructions for supporting data driving a software process, wherein execution of the one or more sequences of instructions by one or more processors causes the one or more processors to perform the steps of:

a choice of a plurality of defining attributes managers to allow selection, from the plurality of a defining attributes manager that provides;
a defining attributes receiving, from a user, input of a class of an object of a non-primitive data type, in absence of a pre-existing instance of the data type; and
a user interface providing to the user a description of the collection of attributes necessary to construct an instance of the object, based only on the class of the object;
wherein receiving the class of the object is in absence of receiving a pre-existing instance of the data type, such that the one or more processors supports data driving a software process using objects of arbitrary data types and free of the user understanding any inner workings of the non-primitive data type in order to create and initialize the instance of the object using defining attribute data received from the user;
using a map means to infer a desirable selection of the defining attributes manager;
using the selected defining attributes manager to provide to the user the description of the collection of attributes necessary to construct the instance of the object, based only on the class of the object;
receiving, in a single user step, user input of defining attribute data necessary to create the instance of the object and set it into a desired state, the received defining attribute data not including a pre-existing instance of the data type;
using the selected defining attributes manager to create and initialize the instance of the object using the received defining attribute data;
the receiving of the user input of the defining attribute data, and the creating and initializing of the instance of the object using the received defining attribute data, not requiring knowledge by the user of the constructors, methods, data structure and initialization sequence necessary to construct the instance of the object; and
comparing more than one potentially different instance of the data type based on the defining attribute data.

12. A computer program product according to claim 11, wherein execution of the one or more sequences of instructions by one or more processors further causes the one or more processors to perform the steps of:
receiving, in a single user step, user input of defining attribute data necessary to create the instance of the object and set it into a desired state; and
creating and initializing the instance of the object using the defining attribute data;
wherein the defining attribute data does not include a pre-existing instance of the data type.

13. A computer system supporting data driving a software process, the system comprising:
in a processor,
a choice of a plurality of defining attributes managers to allow selection, from the plurality of a defining attributes manager that provides;
a defining attributes means for receiving, from a user, input of a class of an object of a non-primitive data type, in absence of a pre-existing instance of the data type; and
a user interface means for providing to the user a description of the collection of attributes necessary to construct an instance of the object, based only on the class of the object, such that the processor supports data driving the software process using objects of arbitrary data types and free of the user understanding any inner workings of the non-primitive data type in order to create and initialize the instance of the object using defining attribute data received from the user;

using a map means to infer a desirable selection of the defining attributes manager;

using the selected defining attributes manager to provide to the user the description of the collection of attributes necessary to construct the instance of the object, based only on the class of the object;

receiving, in a single user step, user input of defining attribute data necessary to create the instance of the object and set it into a desired state, the received defining attribute data not including a pre-existing instance of the data type;

using the selected defining attributes manager to create and initialize the instance of the object using the received defining attribute data;

the receiving of the user input of the defining attribute data, and the creating and initializing of the instance of the object using the received defining attribute data, not requiring knowledge by the user of the constructors, methods, data structure and initialization sequence necessary to construct the instance of the object; and comparing more than one potentially different instance of the data type based on the defining attribute data.

* * * * *